US007549322B2

(12) United States Patent
Kaplan

(10) Patent No.: US 7,549,322 B2
(45) Date of Patent: Jun. 23, 2009

(54) SYSTEM AND METHOD FOR DETECTING A LEAK IN A PIPING SYSTEM

(76) Inventor: Shmuel Kaplan, Shderot Eshkol 48, Jerusalem (IL) 97765

( * ) Notice: Subject to any disclaimer, the term of this patent is extended or adjusted under 35 U.S.C. 154(b) by 246 days.

(21) Appl. No.: 11/712,078

(22) Filed: Feb. 28, 2007

(65) Prior Publication Data

US 2007/0204676 A1 Sep. 6, 2007

(30) Foreign Application Priority Data

Mar. 5, 2006 (IL) ..................................... 174105

(51) Int. Cl.
*G01M 3/08* (2006.01)

(52) U.S. Cl. ........................................ 73/49.1; 340/605

(58) Field of Classification Search .................. 73/49.1; 340/305

See application file for complete search history.

(56) References Cited

U.S. PATENT DOCUMENTS

| | | | | |
|---|---|---|---|---|
| 4,636,637 | A * | 1/1987 | Van Orsdel | 250/231.11 |
| 5,004,014 | A * | 4/1991 | Bender | 137/624.12 |
| 5,214,587 | A * | 5/1993 | Green | 702/60 |
| 5,920,265 | A * | 7/1999 | Johnson et al. | 340/605 |
| 6,317,051 | B1 | 11/2001 | Cohen | |
| 6,323,774 | B1 * | 11/2001 | Mitchell | 340/606 |
| 7,057,507 | B1 * | 6/2006 | Sandifer | 340/531 |

* cited by examiner

*Primary Examiner*—Daniel S Larkin
(74) *Attorney, Agent, or Firm*—Bachman & LaPointe, P.C.

(57) ABSTRACT

There is provided a system for detecting a leak in a piping system, including a monitoring unit disposed at a gateway of the piping system for indicating fluid flow, a gauging unit for gauging the duration of continuous fluid flow, and an indication unit for determining the existence of a leak based on the duration. A method for detecting a leak in a piping system is also provided.

17 Claims, 4 Drawing Sheets

SYSTEM AND METHOD FOR DETECTING A LEAK IN A PIPING SYSTEM

FIELD OF THE INVENTION

The present invention relates in general to piping systems of buildings and more particularly, to the detection of leaks in piping systems of buildings and to automatically shutting them off, when a leak is detected. The invention is further concerned with a method for detecting a leak in a piping system.

BACKGROUND OF THE INVENTION

U.S. Pat. No. 6,317,051 is considered to be the closest prior art. It discloses a water flow monitoring system for determining the presence of leaks in piping having water flowing therethrough under high pressure. The system includes a flow monitor mounted on a pipe for sensing the flow of water through the pipe. There is also provided a controller, composed of a timer and/or an accumulated volume meter associated with the flow monitor, to determine when the flow has continued for a pre-selected period of time, and/or when the amount of water has exceeded a pre-selected accumulated volume threshold, and logic components responsive to changes in flow rate. Upon detection of flow for the pre-selected period of time, and/or pre-selected accumulated volume threshold, a valve is actuated to stop flow through the pipe.

One of the problems that U.S. Pat. No. 6,317,051 deals with is how to indicate whether a water flow is “normal” or a leak in the piping system. According to this patent, a second monitor is provided close to the sewer to sense whether the flow of water has continued through the piping system to the sewer. If the flow is sensed at both locations, then it is assumed that there is no leak. If, however, the flow continues in the upstream location, but not near the sewer, this would be indicative of a leak in the system.

DISCLOSURE OF THE INVENTION

It is an object of the present invention to provide a system and a method for detecting a leak in a piping system, which overcomes the drawbacks of the prior art.

It is a further object of the present invention to provide a system and a method for detecting a leak in a piping system, based on gauging a duration of fluid flow.

Other objects and advantages of the invention will become apparent as the description proceeds.

SUMMARY OF THE INVENTION

In accordance with the present invention there is therefore provided a system for detecting a leak in a piping system, comprising a monitoring unit disposed at a gateway of said piping system for indicating fluid flow, a gauging unit for gauging the duration of continuous fluid flow, and an indication unit for determining the existence of a leak based on said duration.

The invention further provides a method for detecting a leak in a piping system, comprising the steps of monitoring fluid flow through a gateway of said piping system, gauging a duration of said fluid flow, and determining the existence of a leak if said duration exceeds a predetermined time period.

In one aspect, the present invention is directed to a system for detecting a leak in a piping system, the system comprising a monitoring unit disposed at a gateway of the piping system (whether it is an entry or an exit to the piping system), for indicating fluid flow, a gauging unit for gauging the duration of continuous fluid flow, and an indication unit for determining existence of a leak from the duration.

The system may further comprise a spigot unit for stopping the flow of fluid through the gateway upon indicating a leak of fluid in the piping system. The spigot unit may comprise a valve operated by electric power.

The system may further comprise an alarm unit for informing a user about the indication of a leak in the piping system.

According to one embodiment of the present invention, the indication unit determines a leak upon indicating by the gauging unit a continuous flow during a time period.

According to another embodiment of the invention, the indication unit determines a leak by charging a capacitor upon existence of flow in a pipe while continuously discharging the capacitor, until the charge of the capacitor reaches a certain threshold beyond which a leak is determined. The ratio of the discharging may be determined by a trimmer.

According to one embodiment of the invention, the indicating fluid flow is carried out by monitoring a gauge of fluid flow of the piping system, e.g., by a LED operative for generating a light beam through the gauge, and a light indicator operative for detecting interference in the light beam, thereby indicating a movement of the gauge, thereby indicating flow. The indication unit may comprise a CPU.

In another aspect, the present invention is directed to a method for detecting a leak in a piping system, the method comprising the step of monitoring fluid flow through a gateway of the piping (whether it is an entry or an exit to the piping system), gauging the duration of the fluid flow and determining the existence of a leak, if the duration exceeds a predetermined time period. The existence of a leak may be determined by indicating a continuous flow during a predetermined time period.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1:
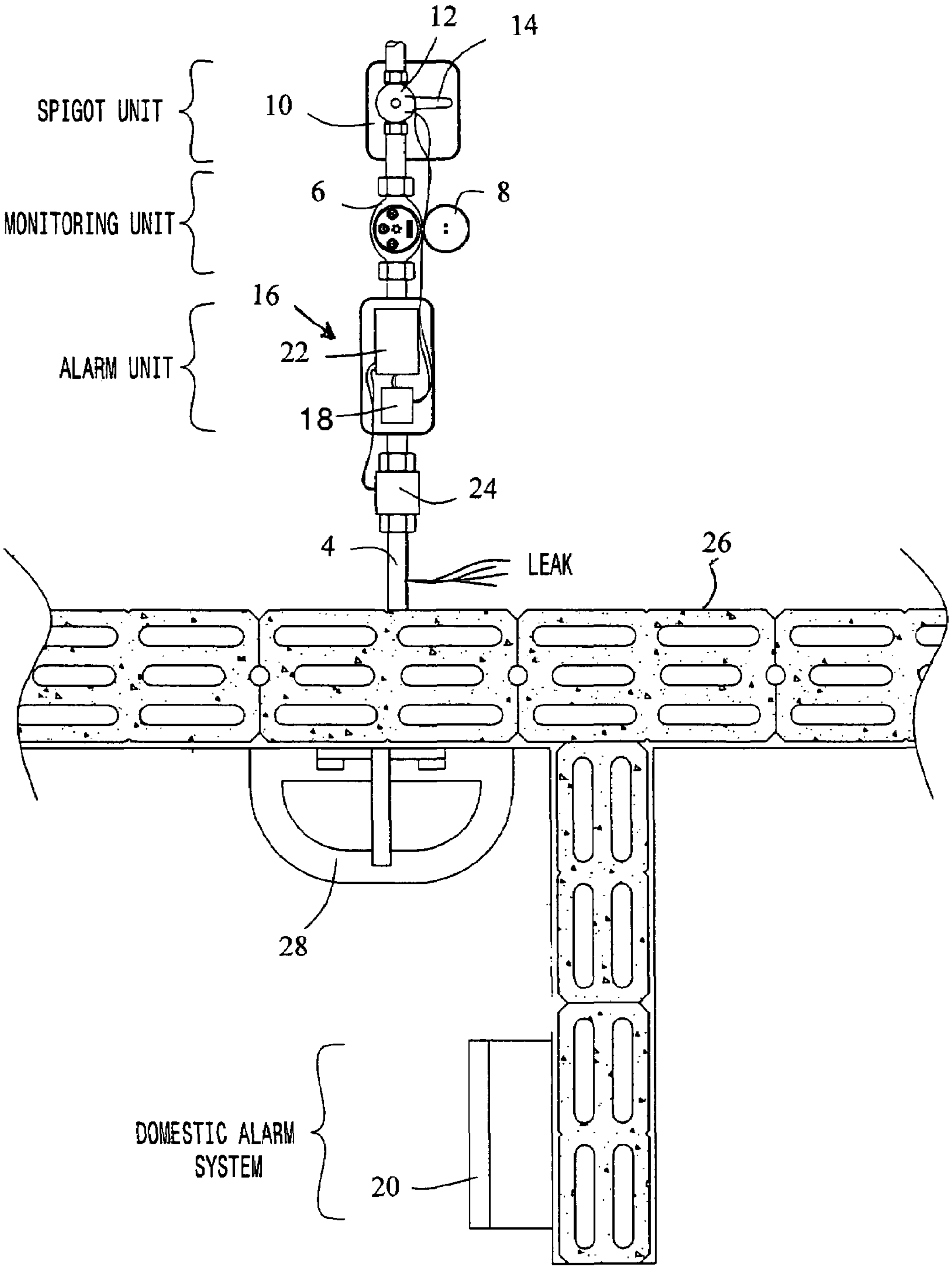
Figure 2:
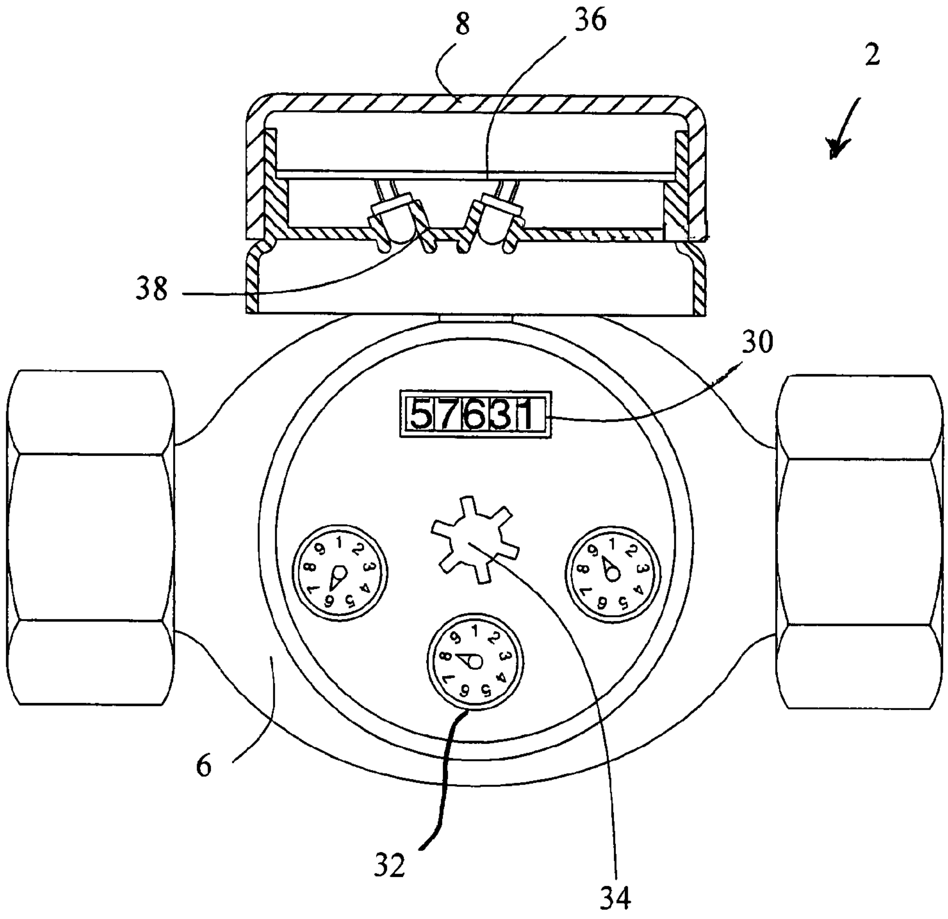
Figure 3:
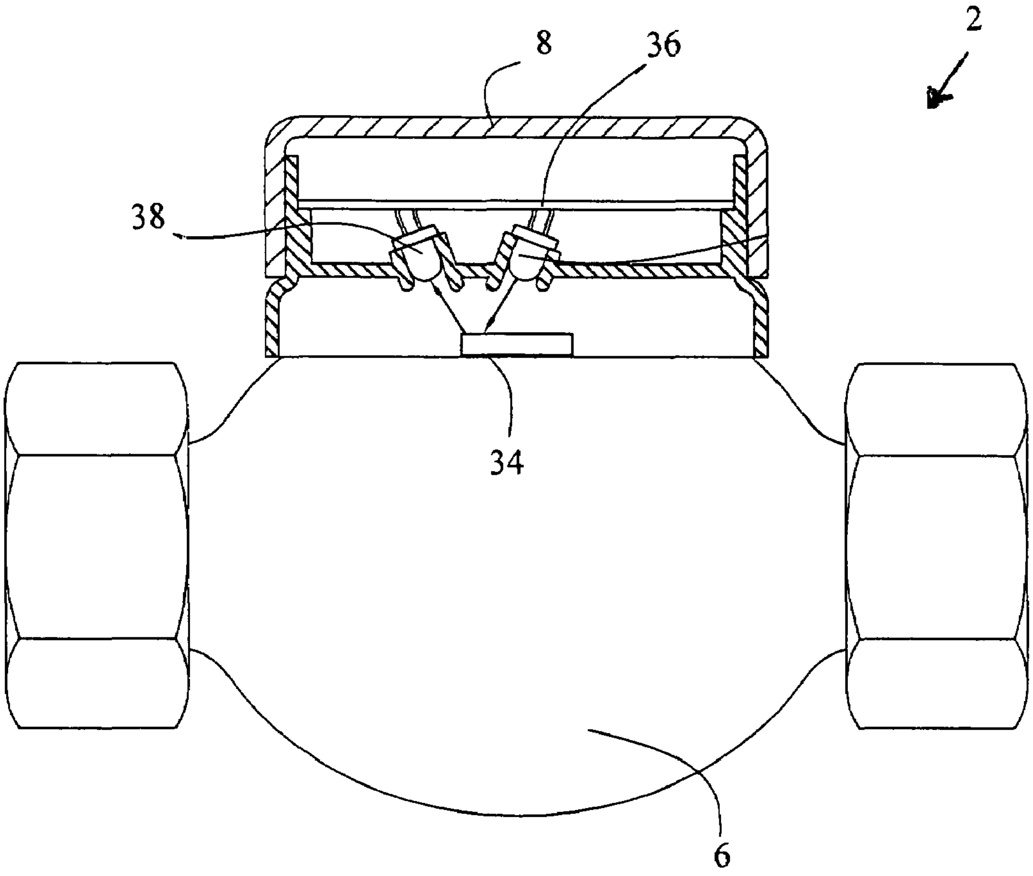
Figure 4:
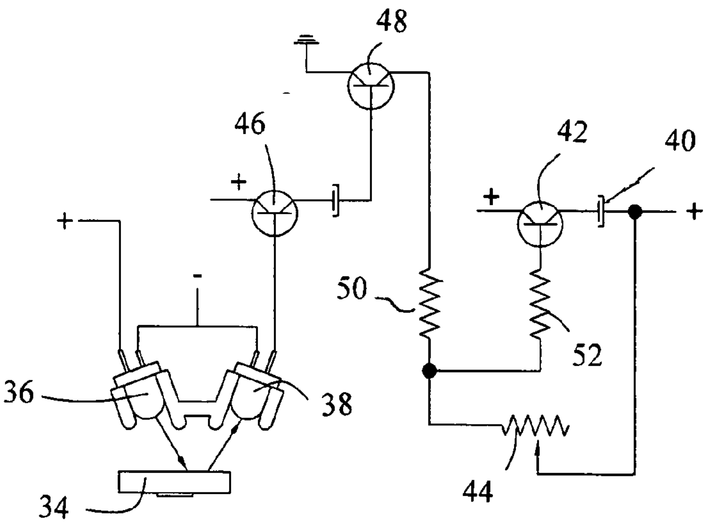
Figure 5:
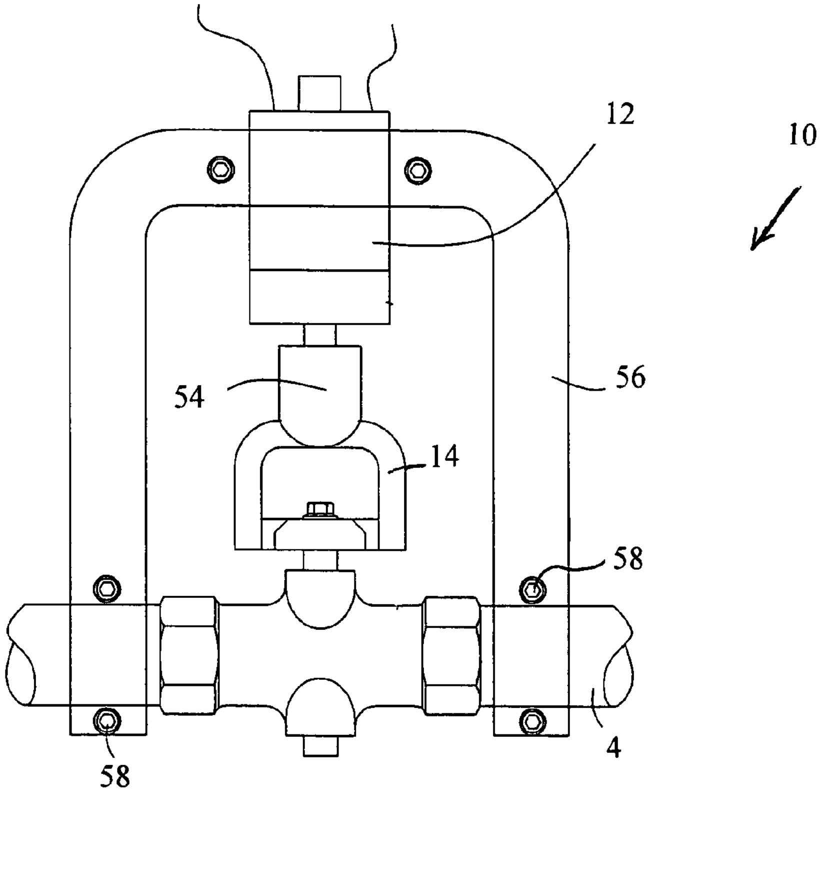

FIG. 1 schematically illustrates a system for detecting leaks in a domestic piping system, according to a preferred embodiment of the present invention;

FIG. 2 schematically illustrates a monitoring unit of a system for detecting leaks in a piping system, according to a preferred embodiment of the present invention;

FIG. 3 schematically illustrates the monitoring unit of FIG. 2, wherein the cover is closed;

FIG. 4 schematically illustrates a circuit for indicating continuous flow during a time period, according to a preferred embodiment of the present invention; and FIG. 5 schematically illustrates a spigot unit, according to a preferred embodiment of the present invention.

DETAILED DESCRIPTION OF THE PREFERRED EMBODIMENTS

FIG. 1 schematically illustrates a system for detecting leaks in domestic water piping, according to a preferred embodiment of the present invention. The basic component of the system is a water flow-monitoring unit (shown as 2 in FIGS. 2 and 3) for monitoring the flow of water through pipe 4, for indicating a leak. According to a preferred embodiment of the present invention, the flow-monitoring unit 2 is mounted on a domestic water meter 6, preferably on a cover 8 thereof.

The system may further comprise a spigot unit 10 for stopping water flow through pipe 4, in the event of a leak. The spigot unit 10 comprises an electrical motor 12, which is mounted on the tap or valve 14. The spigot unit 10, further detailed in FIG. 5, is activated to stop the water flow when a leak is indicated by the monitoring unit 2.

The system may further comprise an alarm unit 16 for informing a user about a leak. The alarm unit 16 comprises a transmitter 18, which sends a signal to a domestic alarm system 20, e.g., calling a user's mobile telephone, etc. The alarm unit 16 may include a rechargeable battery 22 and a dynamo 24, which rotates as the water flows in pipe 4 and charges the battery 22. Other power sources can be employed, such as domestic electric power.

Assuming that pipe 4 is the water source to a building, i.e., the gateway of the piping system, it is preferable to mount a system for detecting leaks on this pipe 4, passing from a wall of the building 26 to, e.g., a sink 28, which is located inside the building 26.

FIG. 2 schematically illustrates the flow-monitoring unit 2 for detecting leaks in a piping system, according to a preferred embodiment of the present invention. According to this embodiment, the monitoring unit 2 is mounted on a water meter cover 8. The cover is shown in its open state and in FIG. 3 the cover is closed. The water meter 6 comprises a counter 30, one or more gauges 32 and a further gauge 34, in the form of a vane.

The monitoring unit 2 includes a LED 36 and a light sensor 38, such as a photoelectric cell. FIG. 3 schematically illustrates the monitoring unit 6 of FIG. 2, wherein the cover 8 is closed, so that the LED 36 and sensor 38 are disposed above the gauge 34. In order to indicate water flow through the water meter 6, LED 36 lights the rotating element, namely, the gauge 34 of the water meter 2, when the cover 8 is closed. The light produced by LED 36 is reflected and sensed by sensor 38.

In order to enable sensing an intermittent signal, at least one of the elements 36 or 38 has to be limited to a "small" region comparable to the entire region of the gauge 34, and to produce a narrow light beam (comparable to the size of the gauge 34), or alternatively, the sensor 38 has to sense a "small" region (comparable to the size of the gauge 34). For example, if the lighted and/or sensed region is 20% of the diameter of the gauge and it is located at the edge of the gauge, then an intermittent signal can be sensed, and also a spot of e.g., transmitted and reflected IR light provide an indication, if the rotation speed of the gauge is "high".

According to a preferred embodiment of the invention, indicating a leak in a piping system is carried out by analysing continuous flow during a time period. For example, in a domestic piping system, continuous water flow during a time period of four hours may not be reasonable. Thus, if the vane of gauge 34 has not moved for a period of four hours, it means that there is no leak. According to another example, in a domestic piping system it is expected that during a vacation, no water flow will be indicated. Therefore, in this situation, if a continuous flow is indicated, i.e., for about two minutes, it may indicate a leak.

As explained above, in a domestic piping system, continuous water flow during a time period of, e.g., four hours, is not reasonable. FIG. 4 schematically illustrates a circuit for indicating continuous flow during a time period, according to a preferred embodiment of the invention. While gauge 34 rotates, capacitor 40 is charged through a switching transistor 42 until it reaches a certain level, which activates another mechanism, such as an alarm unit 16, a spigot unit 10, etc. The signal sensed by sensor 38 is amplified by transistors 46, 48, which results in charging capacitor 40 through resistors 50, 52, while, on the other hand, the circuit discharges capacitor 40. The discharging rate can be adjusted by trimmer 44, whereby a user can control the time required for the capacitor 40 to reach the level at which the other mechanism will be activated.

The circuit scheme of FIG. 4 is an example demonstrating the simplicity of the circuitry required for implementing the present invention. Of course, more sophisticated circuitry can be employed, such as a computerized mechanism, for example, a CPU.

FIG. 5 schematically illustrates a spigot unit 10, according to a preferred embodiment of the invention. An electric motor 12 is connected to tap 14 by a clip 54. The motor is fixed to the pipe 4 by a frame 56 and screws 58. The power and polarity for rotating the tap 14 is provided by an external power source (not shown).

Although nowadays there are a variety of electromechanical means on the market for opening and closing water flow through a pipe (e.g., a solenoid), the mechanism illustrated in FIG. 5 is unique, due to the fact that it can be installed by any user, not necessarily a plumber.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for detecting a leak in a piping system, comprising:

- a monitoring unit disposed at a gateway of said piping system for indicating fluid flow;
- a gauging unit for gauging the duration of continuous fluid flow; and
- an indication unit for determining the existence of a leak based on said duration, said indication unit being responsive to the gauging unit indicating a continuous flow during a predetermined time period by charging a capacitor upon the existence of a flow in a pipe while continuously discharging said capacitor, until the charge of said capacitor reaches a certain threshold beyond which the existence of the leak is determined.

2. The system as claimed in claim 1, further comprising a spigot unit for stopping the flow of fluid through said gateway upon determining the existence of a leak of fluid in said piping system.

3. The system as claimed in claim 2, wherein said spigot unit comprises a valve operated by electrical power.

4. The system as claimed in claim 1, further comprising an alarm unit for informing a user about the indication of the leak in said piping system.

5. The system as claimed in claim 4, wherein said system operates in coordination with a domestic alarm system.

6. The system as claimed in claim 1, wherein the ratio of said charging-to-discharging is determined preset.

7. The system as claimed in claim 6, wherein said presetting is effected by a trimmer.

8. The system as claimed in claim 1, wherein the monitoring unit includes a gauge for monitoring fluid flow in said piping system.

9. The system as claimed in claim 8, wherein monitoring said gauge of flow is effected by a LED operative for generating a light beam through said gauge, and a light indicator operative for detecting interference in said light beam, thereby indicating a movement of said gauge and thereby indicating flow.

10. The system as claimed in claim 1, wherein said indication unit comprises a CPU.

11. A method for detecting a leak in a piping system, comprising the steps of:

monitoring fluid flow through a gateway of said piping system;

gauging a duration of continuous fluid flow; and responsive to continuous fluid flow during a predetermined time period, determining the existence of a leak if said duration exceeds a predetermined time period by charging a capacitor while continuously discharging said capacitor, until the charge of said capacitor reaches a certain threshold that determines the existence of the leak.

12. The method as claimed in claim 11, wherein said gateway is an entry to said piping system.

13. The method as claimed in claim 11, wherein said gateway is an exit from said piping system.

14. A system for detecting a leak in a piping system, comprising:

a monitoring unit for indicating fluid flow being disposed at a gateway of said piping system and including a gauge for monitoring fluid flow in said piping system;

a gauging unit for gauging the duration of continuous fluid flow; and an indication unit for determining the existence of a leak based on said duration;

said monitoring unit being adapted to operate a LED for generating a light beam through said gauge, and being further adapted to operate a light indicator for detecting interference in said light beam, thereby indicating a movement of said gauge and thereby indicating flow.

15. The system as claimed in claim 14, further comprising a spigot unit for stopping the flow of fluid through said gateway upon determining the existence of a leak of fluid in said piping system.

16. The system as claimed in claim 15, wherein said spigot unit comprises a valve operated by electrical power.

17. The system as claimed in claim 14, further comprising an alarm unit for informing a user about the indication of the leak in said piping system.

* * * * *